Figure 1:
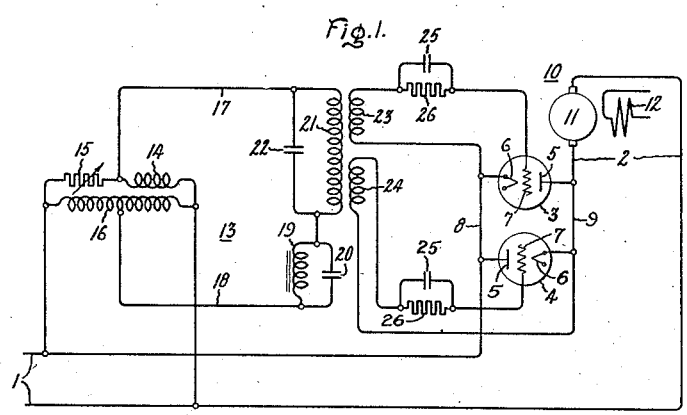

June 29, 1937.  O. W. LIVINGSTON  2,085,595
ELECTRIC VALVE TRANSLATING SYSTEM
Filed May 22, 1936

Inventor:
Orrin W. Livingston,
by Harry E. Dunham
His Attorney.

Patented June 29, 1937

2,085,595

UNITED STATES PATENT OFFICE 2,085,595

ELECTRIC VALVE TRANSLATING SYSTEM

Orrin W. Livingston, Schenectady, N. Y., assignor to General Electric Company, a corporation of New York Application May 22, 1936, Serial No. 81,285

10 Claims. (Cl. 250—27)

My invention relates to electric valve translating systems and more particularly to excitation or control circuits for electric valve means.

In many applications where circuits are energized by means of electric valves, it is desirable to control the electric valves in accordance with a predetermined electrical condition of an associated supply circuit. Heretofore, the electric valve means have been controlled by phase shifting circuits or by controlling the biasing potential introduced in the control circuit. It has been found that the phase shifting method of control is preferable in many applications. In view of this fact, it is desirable to provide an improved control circuit which will control electric valve means automatically by modifying the phase of the potential impressed on the control members in accordance with a predetermined electrical condition of an associated circuit. For example, in voltage regulator arrangements, where a dynamo-electric machine is energized from an alternating current supply circuit, it is frequently desirable to control the machine in accordance with the voltage of the supply circuit. It has, therefore, become evident that it is highly desirable to provide such a control circuit which is simple in construction and arrangement and which will function in a precise and reliable manner without necessitating the use of expensive and complicated auxiliary apparatus.

It is an object of my invention to provide a new and improved control circuit for controlling the conductivity of electric valve means.

It is another obbject of my invention to provide a new and improved electric valve control system for dynamo-electric machines.

It is a further object of my invention to provide an electric valve system for controlling an operating condition of the dynamo-electric machine in accordance with a predetermined electrical condition of an associated supply circuit.

In accordance with the illustrated embodiment of my invention, I provide an electric valve translating system for controlling an operating condition, such as the speed, of a dynamo-electric machine of the direct current type, which is energized from an alternating current circuit. Electric valve means are interposed between the alternating current supply circuit and the dynamo-electric machine, and are arranged to control the direction of current flow through the direct current machine. The electric valve means are controlled by means of an excitation circuit which is energized from the alternating current supply circuit. This excitation circuit comprises a nonlinear resonant circuit of the series-parallel type in which a parallel-connected capacitance and a self-saturating inductance are connected in series relation with an impedance element. Windings are associated with the impedance element to impress on the control members of the electric valve means periodic potentials which vary in accordance with an electrical condition such as the voltage appearing across the terminals of the impedance element. The excitation circuit is energized in accordance with an electrical condition, such as the voltage of the alternating current supply circuit, and is arranged so that for voltages below a predetermined voltage, the periodic potentials impressed on the control members of the electric valve means have a predetermined phase relationship relative to the potentials impressed on the anodes of the electric valve means. Above a predetermined critical voltage of the alternating current circuit, the excitation circuit effects a shift in phase of the periodic potentials impressed on the control members of the electric valve means to cause the electric valve means to reverse the direction of current transfer through the dynamo-electric machine, and thereby control an operating condition of the dynamo-electric machine.

Figure 2:
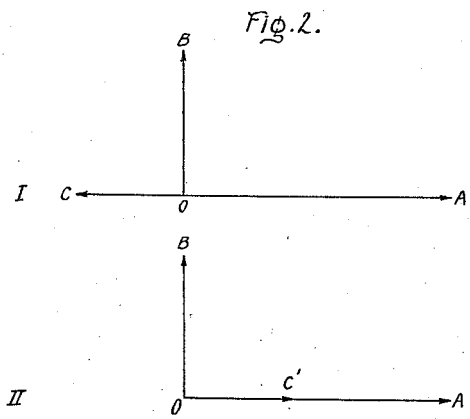

For a better understanding of my invention, reference may be had to the following description taken in connection with the accompanying drawing and its scope will be pointed out in the appended claims. Fig. 1 of the accompanying drawing diagrammatically represents an embodiment of my invention as applied to an electric valve control circuit for controlling a dynamo-electric machine of the direct current type, while Fig. 2 represents certain operating characteristics of the embodiment of my invention illustrated in Fig. 1.

Referring now to Fig. 1 of the accompanying drawing, my invention is diagrammatically illustrated as applied to an electric valve translating system for controlling the energization of a dynamo-electric machine of the direct current type in accordance with an electrical condition of an alternating current supply circuit. The alternating current supply circuit 1 is employed to energize a direct current circuit 2 through oppositely disposed electric valve means 3 and 4 having anodes 5, cathodes 6, and control members 7. The electric valve means 3 and 4 are preferably of the type employing ionizable mediums such as gases or vapors, and although I have shown the electric valve means 3 and 4 as being energized from a single phase circuit and being of the type employing a cathode and a single anode enclosed in separate receptacles, it is to be noted that I may employ a polyphase circuit and a plurality of oppositely disposed electric valve means of the type having a plurality of anodes enclosed in a single receptacle. The anode 5 of electric valve 4 and cathode 6 of electric valve 3 are connected together by means of a conductor 8, and the cathode 6 of electric valve 4 and the anode 5 of electric valve 3 are connected together by means of a conductor 9. A dynamo-electric machine 10 having an armature member 11 and a field member 12 is connected in the direct current circuit 2. The field member 12 may be energized from any suitable source of direct current.

In order to control the energization of the dynamo-electric machine 10 in accordance with an electrical condition, such as the voltage of the alternating current supply circuit 1, I provide an excitation circuit 13. Any conventional phase shifting arrangement, such as the phase shifting circuit including an inductance 14, a variable resistance 15 and an auto-transformer 16 is energized from the alternating current circuit 1 and is employed to provide a potential which has a phase displacement of substantially 90 electrical degrees in advance of the potential of the alternating current circuit 1. This potential is impressed on an nonlinear resonant circuit through conductors 17 and 18. The nonlinear circuit comprises a parallel-connected, self-saturating inductance 19 and a capacitance 20 which are connected in series relation with an impedance element 21. A capacitance 22 is connected across the terminals of the impedance element 21 in order to neutralize the inductive effect of the impedance element 21 so that the impedance element 21 and the capacitance 22 offer a substantially resistive impedance as viewed from the terminal connections of these elements. Windings 23 and 24 are inductively coupled with the impedance element 21 so that these elements impress on the control members 7 of electric valves 3 and 4 potentials which vary in accordance with an electrical condition such as the voltage appearing across the terminals of the impedance element 21. Connected in series with the upper terminals of each of the windings 23 and 24, I provide a self-biasing arrangement including a parallel-connected capacitance 25 and a resistance 26. It will be noted that the windings 23 and 24 are arranged so that the potentials impressed on the control members 7 of electric valves 3 and 4 are substantially in phase relative to each other.

In explaining the operation of the embodiment of my invention diagrammatically illustrated in Fig. 1, let it be assumed that it is desired to control the speed of the dynamo-electric machine 10. Let it further be assumed that it is desired to operate the dynamo-electric machine in one direction of rotation for voltages of the alternating current circuit 1 below a predetermined value and that it is desirable to reverse the direction of rotation of the dynamo-electric machine 10 for voltages of the alternating current circuit 1 above a predetermined value. If the voltage of the alternating current circuit 1 is below the above mentioned predetermined value, the current which flows through the impedance element 21 will be predominately capacitive since the saturable inductance 19 is designed to saturate at a value of current corresponding to a higher critical voltage than that acting in the circuit under these conditions.

Referring now to Diagram I of Fig. 2, the vector OA may be employed to represent the potential of the alternating current circuit 1 and the vector OB may be employed to represent the potential impressed on the non-linear circuit through conductors 17 and 18. Since the current through the impedance element 21 is predominately capacitive and since this branch of the nonlinear circuit is predominately resistive, the potential appearing across the impedance element 21 may be represented by a vector OC which leads the vector OB by substantially 90 electrical degrees. It will, therefore, be understood that since this condition obtains, the periodic potential impressed on the control member 7 of electric valve 4 will be substantially 180 electrical degrees out of phase with the potential impressed on the anode of this valve, thereby maintaining electric valve 4 nonconductive. However, since the electric valve 3 is oppositely disposed relative to electric valve 4, the potential impressed on the control member 7 of electric valve 3 will be substantially in phase with the potential impressed on the anode 5 of electric valve 3, thereby rendering the electric valve 3 conductive and causing current to flow through the armature member 11 of the dynamo-electric machine 10.

If it be assumed that the voltage of the alternating current circuit 1 increases to a value greater than the above mentioned critical value, the saturable inductance 19 will become saturated, effecting thereby a reduction in the value of the inductive reactance which this member offers to the flow of current in the nonlinear circuit. By the proper choice of constants for the elements in the nonlinear circuit, the inductive current which flows through the inductance 19 may be made to predominate over the capacitive current so that the net current which flows in the nonlinear circuit is predominately inductive, occasioning thereby a shifting in phase of the potential appearing across the impedance element 21. Referring to Diagram II of Fig. 2, corresponding vectors have been given like reference characters to those employed in Diagram I. However, it will be noted that the vector OC', which represents the voltage appearing across the impedance element 21, is retarded 180 electrical degrees relative to the position of this potential as represented by vector OC in Diagram I so that the potential appearing across the impedance element 21 is substantially in phase with the potential of the alternating current circuit 1, as represented by the vector OA. By virtue of this shift in phase, the electric valve 4 will be rendered conductive while the electric valve 3 will be maintained nonconductive, effecting thereby a reversal in the direction of current transfer through the armature member 11 of dynamo-electric machine 10 and causing thereby a reversal in the direction of rotation of the machine 10.

Although in the above described arrangement of my invention, I have diagrammatically shown a control system which operates in accordance with the voltage variations of the associated supply circuit, it should be understood that my invention in its broader aspects may be applied to control a dynamo-electric machine in accordance with other electrical conditions such as current, power factor, etc. of the supply circuit.

While I have shown and described my invention as applied to a particular system of connections and as embodying various devices diagrammatically shown, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States is:

1. In combination, an alternating current circuit, an electric valve means associated with said alternating current circuit and having a control member, and an excitation circuit including means energized from said alternating current circuit in accordance with an electrical condition of said alternating current circuit for providing an alternating voltage having a predetermined phase displacement relative to the voltage of said alternating current circuit and a nonlinear resonant circuit energized in accordance with the voltage of said second mentioned means for impressing on said control member a periodic potential having a predetermined phase position relative to the voltage of said alternating current circuit for values of said electrical condition below a predetermined value and for shifting the phase of said periodic potential for values of said electrical condition of said alternating current circuit above said predetermined value.

2. In combination, an alternating current circuit, an electric valve means associated with said alternating current circuit and having a control member, and an excitation circuit including means energized from said alternating current circuit for providing an alternating voltage having a predetermined phase displacement relative to the voltage of said alternating current circuit and a nonlinear resonant circuit energized in accordance with the voltage of said second mentioned means for impressing on said control member a periodic potential having a predetermined phase position relative to the voltage of said alternating current circuit for voltages of said alternating current circuit below a predetermined value and for shifting the phase of said periodic potential substantially 180 electrical degrees for voltage of said alternating current circuit above said predetermined value.

3. In combination, an alternating current circuit, electric valve means associated with said alternating current circuit and having a control member, and an excitation circuit including means energized from said alternating current circuit for providing a source of voltage having a predetermined phase displacement relative to the voltage of said alternating current circuit and a nonlinear resonant circuit of the series-parallel type energized in accordance with the voltage of said source and having a parallel-connected capacitance and a saturable inductance and an impedance element connected in series relation with said parallel-connected capacitance and inductance for impressing on said control member a periodic potential having a predetermined phase position relative to the voltage of said alternating current circuit for voltages of said circuit below a predetermined value and for shifting the phase of said periodic potential for voltages of said alternating current circuit above said predetermined value.

4. In combination, an alternating current circuit, electric valve means associated with said circuit and having a control member, and an excitation circuit energized from said alternating current circuit comprising means for providing a source of voltage having a predetermined phase displacement relative to the voltage of said alternating current circuit, a nonlinear resonant circuit of the series-parallel type energized from said source including a parallel-connected saturable inductance and a capacitance connected in series relation with an impedance element and means responsive to an electrical condition of said impedance element for impressing on said control member a periodic potential having a predetermined phase relation with respect to the voltage of said alternating current circuit within a predetermined range of voltages of said alternating current circuit and having a predetermined different phase relation with respect to the voltage of said alternating current circuit within a predetermined different range of voltages.

5. In combination, an alternating current circuit, an electric valve means associated with said circuit and having a control member, and an excitation circuit energized from said source comprising means for providing a source of potential having a phase displacement of substantially 90 electrical degrees relative to the potential of said alternating current circuit, a nonlinear resonant circuit of the series-parallel type connected to be energized from said source including a parallel-connected capacitance and a saturable inductance connected in series relation with an impedance element and means responsive to an electrical condition of said impedance element for impressing on said control member a periodic potential being substantially in phase with the voltage of said alternating current circuit for voltages of said circuit within a predetermined range of voltages and being substantially 180 electrical degrees out of phase with respect to the voltage of said alternating current circuit within a predetermined different range of voltages.

6. In combination, an alternating current circuit, a direct current circuit, a pair of electric valve means interconnecting said circuits for controlling the direction of current transfer in said direct current circuit and each having a control member, and an excitation circuit including means energized from said alternating current circuit for providing an alternating voltage having a quadrature phase displacement relative to the voltage of said alternating current circuit and a nonlinear resonant circuit of the series-parallel type energized in accordance with the voltage of said second mentioned means and including a parallel-connected capacitance and a saturable inductance connected in series relation with an impedance element for impressing on said control members periodic potentials having predetermined phase displacements with respect to the voltage of said alternating current circuit within a predetermined range of voltages of said circuit and having predetermined different phase displacements with respect to the voltage of said alternating current circuit within a predetermined different range of voltages.

7. In combination, an alternating current circuit, a direct current circuit, a pair of electric valve means interconnecting said circuits and being oppositely disposed and each having a control member, and an excitation circuit including means energized from said alternating current circuit for providing an alternating voltage having a predetermined phase displacement relative to the voltage of said alternating current circuit and a nonlinear resonant circuit of the series-parallel type energized in accordance with the voltage of said second mentioned means and having a parallel-connected capacitance and a saturable inductance connected in series relation with an impedance element for rendering one of said electric valve means conductive within a predetermined range of voltages of said alternating current circuit and for rendering the other of said electric valve means conductive within a predetermined different range of voltages of said alternating current circuit.

8. In combination, an alternating current circuit, a direct current circuit, electric valve means interposed between said direct current circuit and said alternating current circuit for supplying direct current to said direct current circuit and for controlling the direction of current transfer through said direct current circuit, and an excitation circuit energized from said alternating current circuit in accordance with an electrical condition of said alternating current circuit comprising a nonlinear resonant circuit of the series-parallel type for controlling the conductivity of said electric valve means to effect a reversal in the direction of current transfer through said direct current circuit when said electrical condition of said alternating current circuit exceeds a predetermined value.

9. In combination, an alternating current circuit, a direct current circuit, a pair of electric valve means interposed between said circuits and each having a control member, said electric valve means being oppositely disposed to transmit current through said direct current circuit in opposite directions, and an excitation circuit energized from said alternating current circuit comprising a nonlinear resonant circuit of the series-parallel type including a parallel-connected capacitance and a saturable inductance connected in series relation with an impedance element for impressing on said control members periodic potentials to render one of said electric valve means conductive within a predetermined range of voltages of said alternating current circuit to transmit current in one direction through said direct current circuit and to render the other of said electric valve means conductive within a predetermined different range of voltages of said alternating current circuit to effect a reversal in the direction of current flow through said direct current circuit.

10. In combination, an alternating current circuit, a direct current circuit, a pair of electric valve means interposed between said circuits and each having a control member, said electric valve means being oppositely disposed to transmit current in opposite directions through said direct current circuit, and an excitation circuit energized from said alternating current circuit comprising means for providing a source of alternating voltage having a phase displacement of substantially 90 electrical degrees relative to the voltage of said alternating current circuit and a nonlinear resonant circuit of the series-parallel type energized from said source for impressing on said control members of said electric valve means periodic potentials which are substantially in phase with the voltage of said alternating current circuit within a predetermined range of voltages of said alternating current circuit to render one of said electric valve means conductive and for shifting the phase of said periodic potentials substantially 180 electrical degrees for voltages of said alternating current circuit within a predetermined different range of voltages to render the other of said electric valve means conductive.

ORRIN W. LIVINGSTON.